(No Model.)
E. G. ACHESON.
PRODUCING PURE ELECTRIC LIGHT CARBON.
No. 542,982. Patented July 23, 1895.
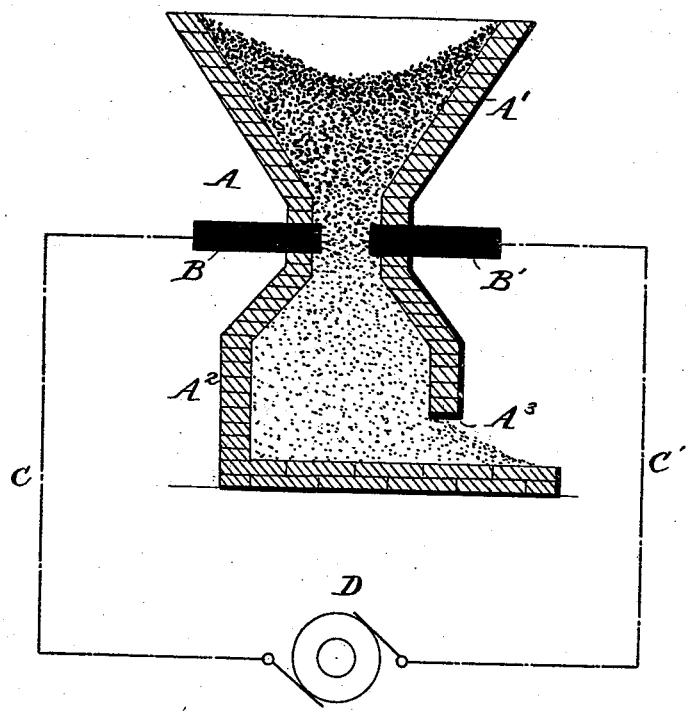
Witnesses
Inventor
Edward G. Acheson
by
Attorneys

UNITED STATES PATENT OFFICE.

EDWARD GOODRICH ACHESON, OF MONONGAHELA CITY, PENNSYLVANIA.

PRODUCING PURE ELECTRIC-LIGHT CARBON.

SPECIFICATION forming part of Letters Patent No. 542,982, dated July 23, 1895.

Application filed August 25, 1894. Serial No. 521,325. (No specimens.)

*To all whom it may concern:*

Be it known that I, EDWARD GOODRICH ACHESON, a citizen of the United States, residing at Monongahela City, in the county of Washington and State of Pennsylvania, have invented certain new and useful Improvements in Producing Pure Electric-Light Carbon, of which the following is a specification.

My invention relates to the process of producing pure electric-light carbon, and it has for its object to produce pure carbon; and my invention consists in the method, substantially as hereinafter more particularly set forth, whereby impure carbon or carbonaceous materials are treated and pure electric-light carbon thereby produced.

The primary object of my invention is to free the ordinary forms of commercial carbon of all its impurities—such as silica, sulphur, lime, hydrogen, and oxygen—and thereby fit it for use for electrical purposes, as, for instance, in the manufacture of rods or points for electric lighting, and for the manufacture of brushes, collectors, or contacts for electric apparatus.

It is well known that for many purposes, and notably carbon rods or points used in electric lighting, it is essential to have a carbon in a pure form, impurities—such, for instance, as silica, lime, or sulphur—being detrimental, as it has been found that they produce vapors, colors, or irregularity in the burning of the rods or points.

The primary object of my invention is to eliminate all the impurities ordinarily found in commercial carbon.

I have discovered that impure commercial carbon or carbonaceous materials may be subjected to a high temperature, especially that produced by an electric current, in such a manner that as a result the impurities are volatilized while the carbon is left in a practically pure state and with a largely-increased electric conductivity, thereby rendering it practically well suited for the purposes of electric-arc lights.

In carrying out my invention I take carbonaceous material, as ordinary commercial coke, and subject it to the action of an electric current of sufficient strength and for a sufficient length of time to effect the required volatilization of the impurities.

I have found by experience that ordinary coke—such, for instance, as that produced from bituminous coal—gives good results. This coke is reduced to a proper state of subdivision or granulation and subjected to a high degree of heat, and for this purpose I preferably make use of an electric furnace. Any suitable furnace may be used which is capable of withstanding the proper degree of heat, and the material is placed in the furnace in such a manner as to allow the current of electricity to pass through it. Thus in the accompanying drawing I have illustrated what I consider to be the most practical form of furnace, in which the construction is such as to permit of a continuous operation, in which the figure is a partial sectional view and partial diagrammatic view.

Referring to the drawing, A represents the walls of a furnace, which may be made of firebrick or other suitable highly-refractory material, the upper portion $A'$ of which is flaring or hopper shape to conveniently receive the granulated carbonaceous material, and the lower portion $A^2$ of which is expanded to form a receiver of the treated material and which is provided with a suitable discharge orifice $A^3$. Located in the throat or contracted portion are the electrodes B B', the inner ends of which are arranged opposite each other and at such distance as may be necessary to the proper operation of the furnace. Its successful operation depending upon the mass of material being operated upon, the amperage and voltage of the current used in any particular case, and these conditions must be so adjusted as to permit of the elevation of the individual particles of the carbonaceous material to the required temperature to produce the volatilization of the associated impurities as they successively follow each other in the passage between the electrodes.

The electrodes are connected by the conductors C C' to a suitable source of electrical energy D, provided with the usual appliances for regulating and controlling the electric rent. After the material is treated it may be withdrawn at the orifice A³, and the rate of its withdrawal will control the time of its exposure to the action of the zone of high temperature between the electrodes. The purified product is then to be further reduced in fineness, if desired, and formed into rods, points, contacts, &c., by the usual methods. In this way I am enabled to utilize the cheaper and impure forms of carbonaceous materials—such as ordinary coke—that have heretofore been practically worthless for electric lighting purposes, obtaining from them a carbon that is even superior to the best now used, owing to its exceeding purity and high electric conductivity as well as softness, which permits of its more easy molding into the required forms, producing a more homogeneous mass with a given pressure.

What I claim is—

The method, substantially as above described, of producing pure electric light carbon, which consists in granulating coke, and subjecting it to the required degree of temperature necessary to volatilize the impurities associated with it.

In testimony whereof I have signed my name to this specification in the presence of two subscribing witnesses.

EDWARD GOODRICH ACHESON.

Witnesses:
 F. L. FREEMAN,
 R. N. DOBSON.